United States Patent [19]

Eidsmore et al.

[11] 4,174,733
[45] Nov. 20, 1979

[54] PROCESS GAS FLOW CONTROL MODULE

[75] Inventors: Paul G. Eidsmore, Saratoga; Alva A. Eidsmore, Santa Cruz, both of Calif.

[73] Assignee: Fischer & Porter Company, Warminster, Pa.

[21] Appl. No.: 834,507

[22] Filed: Sep. 19, 1977

[51] Int. Cl.² ............................................. F16K 37/00
[52] U.S. Cl. ...................................... 137/552; 73/209; 73/199; 137/557; 137/561 A; 137/883; 137/884; 137/269
[58] Field of Search .................... 73/168, 199, 209; 137/552, 557, 505.12, 561 A, 883, 884, 887, 269, 271, 505, 505.41; 251/368

[56] References Cited

U.S. PATENT DOCUMENTS

| | | | |
|---|---|---|---|
| 2,655,041 | 10/1953 | Jacobsson | 73/199 |
| 2,970,472 | 2/1961 | Jones et al. | 73/199 |
| 2,970,473 | 2/1961 | Kendig | 73/199 |
| 2,982,135 | 5/1961 | Rogers | 73/209 |
| 3,117,587 | 1/1964 | Willinger | 137/271 |
| 3,259,054 | 7/1966 | Vanzo, Jr. et al. | 73/209 |
| 3,260,278 | 7/1966 | Lund et al. | 137/505.12 |
| 3,848,626 | 11/1974 | Smith et al. | 137/221 |
| 3,857,407 | 12/1974 | Olson | 137/505.41 |
| 3,956,933 | 5/1976 | Metzger | 73/209 |
| 3,971,542 | 7/1976 | Lee | 251/368 |

FOREIGN PATENT DOCUMENTS 1750725  5/1968  Fed. Rep. of Germany ...... 137/561 A

*Primary Examiner*—William R. Cline
*Assistant Examiner*—H. Jay Spiegel
*Attorney, Agent, or Firm*—Michael Ebert

[57] ABSTRACT

A module which integrates into a single block a process gas flow control system for precisely metering the flow of gas fed into a furnace diffusion tube or other utilization device. The block is formed of a chemically-inert body having cavities therein for nesting a gas filter, a pressure-regulator, a flowmeter, a pressure indicator and the other components of the system necessary to set the flow rate and pressure of the gas. These components are intercoupled by internal bores in the block which define flow passages that communicate with the cavities.

5 Claims, 6 Drawing Figures

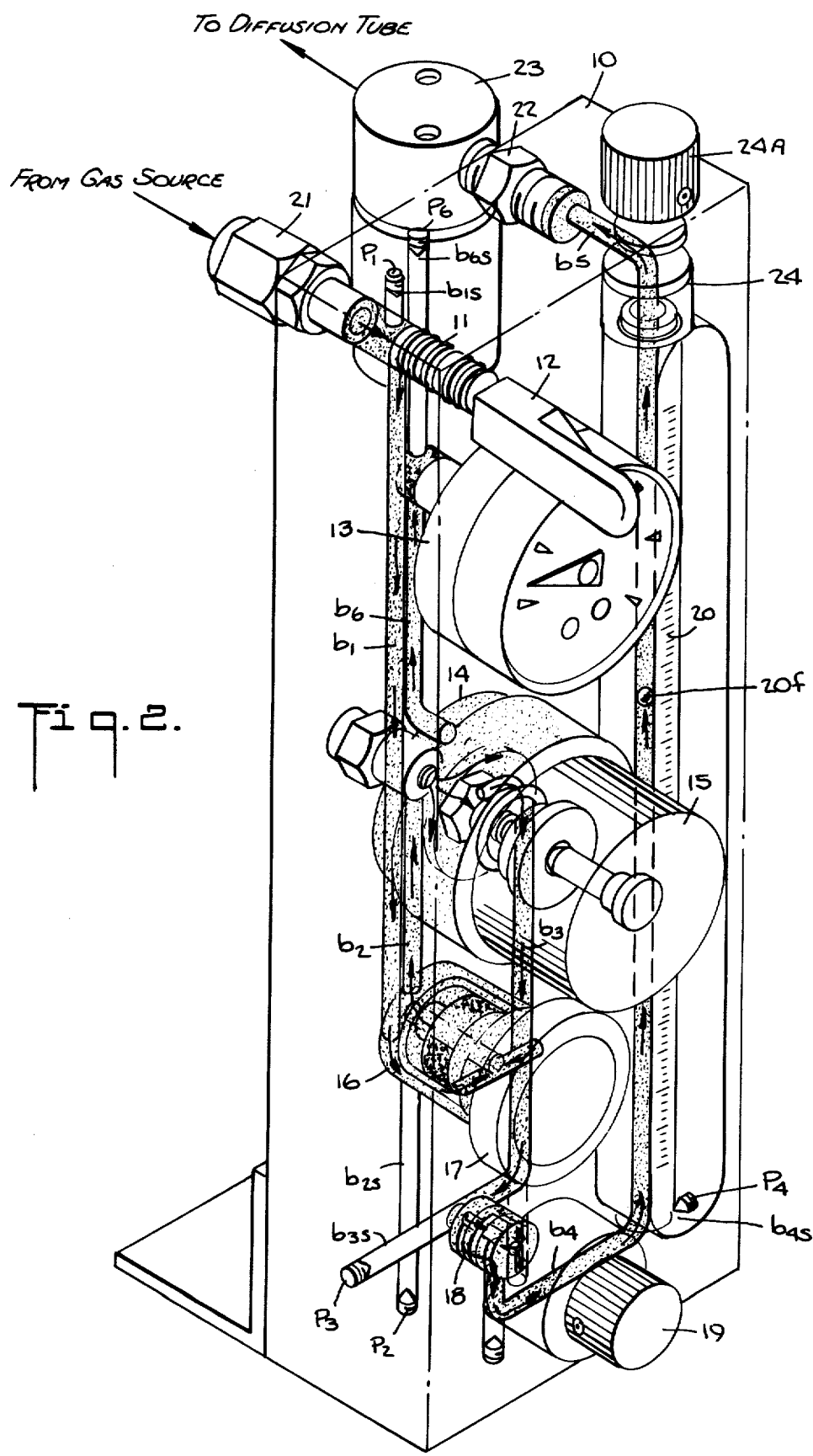

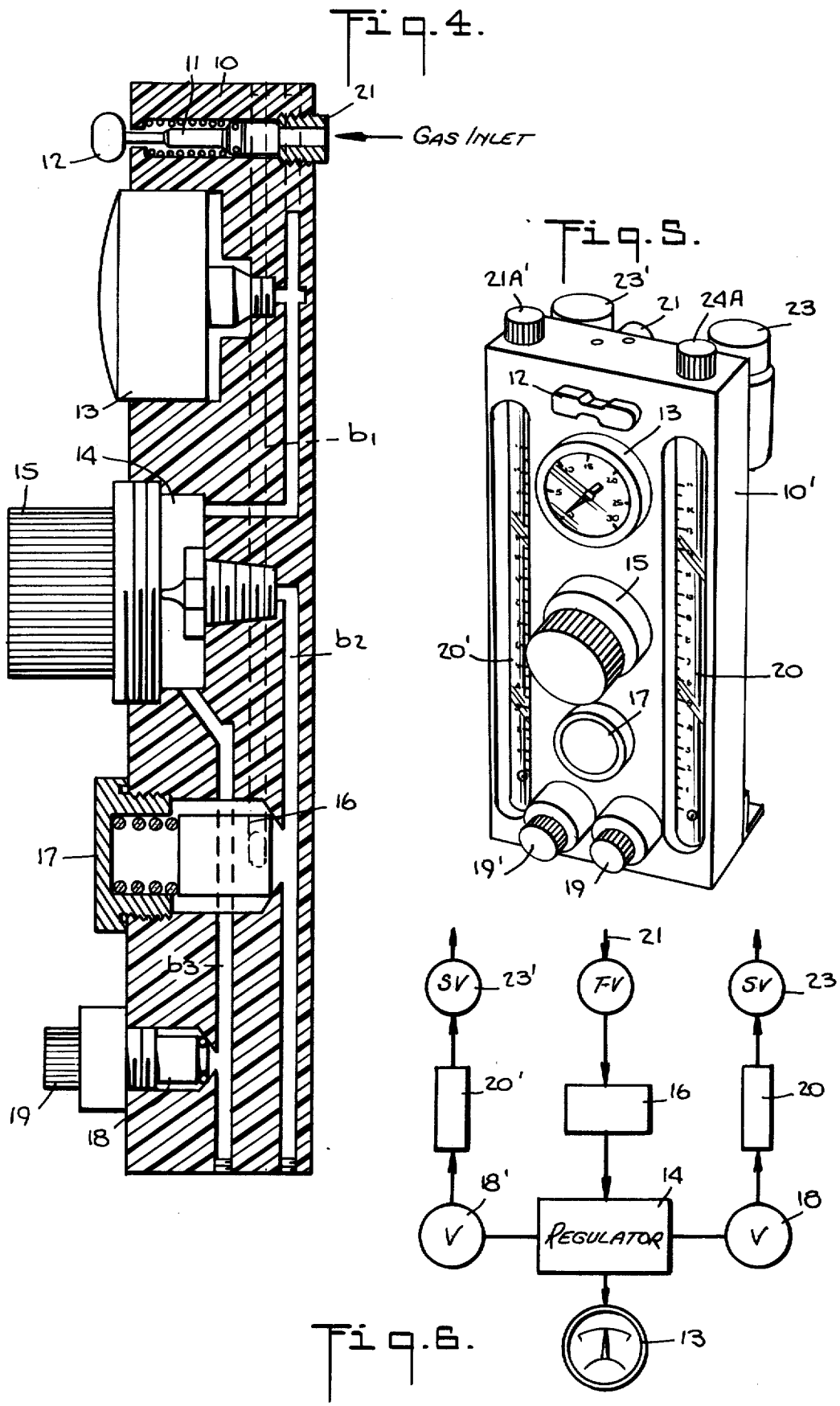

PROCESS GAS FLOW CONTROL MODULE

BACKGROUND OF INVENTION

This invention relates generally to a process gas flow control system for use in fabricating microelectronic solid-state devices and in other applications, and more particularly to a module which integrates into a single block the various components of the system and their interconnections.

Many circuits and complex multi-stage electronic systems that previously were regarded as economically unfeasible and impractical are now realizable with integrated circuits. The fabrication of a monolithic circuit involves the formation of diodes, transistors, resistors and capacitors on a single substrate, with sufficient isolation between circuit components to minimize parasitic interaction therebetween.

The first phase in fabricating an integrated circuit is a photo resist and oxide-masking process. Because the diffusion constant of typical impurities is much smaller in silicon dioxide than in silicon, a thin layer of silicon dioxide can be used on a silicon wafer to selectively control areas in which diffusion of impurities occurs. In those areas where diffusion into the silicon wafer is desired, the layer of silicon dioxide is removed by etching. If impurity atoms are now applied uniformly to the entire surface and the wafer is heated, diffusion takes place into the exposed silicon, but there is negligible diffusion into the silicon dioxide and the underlying silicon. Thus the silicon dioxide layer acts as a "mask" during the diffusion cycle.

To implement the etching of apertures in silicon dioxide, a photographic technique is employed. The silicon dioxide surface is uniformly coated with a material known as "photo resist." A glass mask containing a pattern of opaque and transparent regions is placed in contact with the photo resist layer, and the assembly then exposed to ultraviolet light. This brings about polymerization in the photo resist layer which makes those areas which have been exposed insoluble in the developing solution. The developer is used to remove the unexposed photo resist.

Exposed photo resist is also insoluble in hydrofluoric acid, which may now be used to remove the areas of silicon dioxide not covered by photo resist. While the hydrofluoric acid removes silicon dioxide, it does not react with silicon. Thus, at this point in the process, certain areas of the silicon surface are exposed, while the remainder are covered with silicon dioxide and photo resist. The photo resist is next removed with hot sulfuric acid and the wafer is now ready for the diffusion process.

Diffusion is performed in an appropriate atmosphere, and a new layer of silicon dioxide is grown on the wafer. Hence at the termination of each diffusion cycle, the entire wafer is covered by silicon dioxide. The areas in which succeeding diffusions occur are controlled by repeating the photo-resist process.

Diffusion is carried out by placing the wafer in a quartz diffusion tube mounted within a furnace operating at a temperature in the order of 1000° C. and higher. In constant-source diffusion, the wafer in the diffusion tube is exposed to a vapor containing a compound with the desired impurity atoms. This compound reacts with the silicon on the surface, yielding impurities in atomic form. As impurity atoms diffuse into the silicon, more are formed at the surface. In limited-source diffusion, a fixed number of impurity atoms/$cm^2$ is deposited on the silicon surface, and as impurities diffuse into the silicon, they are not replaced at the surface.

Thus in the processing of integrated circuits, oxidizing, reducing and reactive gases are required. It is vital that the gas fed into each diffusion tube in the furnace be of acceptable purity and that the gas be precisely metered. To this end, it has heretofore been the practice to employ a gas flow control system for each gas, the system being adapted to receive the gas from a source at an uncontrolled pressure, to pressure-regulate the gas and to filter it to remove contaminants therefrom. Also necessarily included in the system are means to control the flow rate of the pressure-regulated gas and to indicate the prevailing pressure and flow rate.

The typical gas flow control system for this purpose includes an on-off toggle valve, a gas filter, a diaphragm-type pressure regulator, a pressure gauge, a flow-control valve and a flowmeter or rotameter. In addition to these basic components, the system may optionally include a solenoid valve, a flow switch, a flow controller and a pressure-responsive switch.

The several components which make up the conventional flow control system are mounted on a suitable chassis, fittings and pipes or tubing being provided to intercouple the components to create the necessary flow path. It is essential that all components and all plumbing associated therewith be of materials non-reactive with the gas being metered. In the typical furnace installation, a number of such systems are required, one for each gas being metered. Because each system is constituted by a combination of components and a network of interconnecting pipes, the resultant multi-system arrangement becomes a confusing and intricate maze which presents a jungle-like appearance creating serious maintenance problems.

In order to better organize the combination of components which together constitute a process gas flow control system, attempts have heretofore been made to panel-mount these components in a manner simplifying the required plumbing and minimizing the confusion produced thereby. Among the ordered systems of this type which are commercially-available are those manufactured by Corso-Gray Instrument Inc. of San Jose, California (Models D-3-O and 310) and by Fischer & Porter of Warminster, Pa. (Catalog 80 A 449 for Modular Gas Control Systems).

Though commercially-available gas flow control systems are described as modular, the fact is that they still require relatively elaborate plumbing arrangements which entail pipes and fittings that complicate manufacturing and maintenance procedures.

SUMMARY OF INVENTION

In view of the foregoing, it is the main object of this invention to provide a module which integrates into a single block the various components of a gas flow control system and their interconnections, thereby dispensing with the plumbing heretofore necessary for such systems.

More particularly, it is an object of this invention to provide a gas flow module usable with any type of gas required in integrated circuit diffusion procedures, the conduits intercoupling the several components of the system being defined by internal bores in the block which communicate with the cavities in which the components are nested.

A significant feature of the invention is that the bores which provide the conduits interconnecting the components of the system terminate in ports on the surface of the block. These ports are normally closed by a removable plug, whereby the bores may be cleaned, when necessary, to remove contaminants which impede or block the passage of the gas.

Another advantage of a module in accordance with the invention is that no matter what the process or how many gases are involved therein, a furnace-associated system can be built combining identical modules, each affording precise process gas control for a particular gas.

Yet another object of this invention is to provide an efficient and reliable gas flow control module that is highly compact, that requires virtually no maintenance, and that can be constructed at relatively low cost.

Briefly stated, these objects are attained in a modular gas flow control system whose components, which include a gas-pressure-regulator, a flow control valve and pressure and flow rate indicators, are nested within cavities formed within a single block of a material which is chemically inert with respect to the gas being metered.

The nested components which make up the system are intercoupled by a network of internal bores formed in the block, the bores defining flow passages which communicate with the cavities to effect gas interconnections for the components therein.

OUTLINE OF DRAWINGS

For a better understanding of the invention as well as other objects and further features thereof, reference is made to the following detailed description to be read in conjunction with the accompanying drawings, wherein:

FIG. 2 is another perspective view of the same module in which the module block is rendered transparent to reveal the components nested therein and the internal bores which form the network of gas passages interconnecting the components;

FIG. 4 is a longitudinal section taken through the module;

FIG. 5 is a perspective view of a dual-channel module in accordance with the invention; and FIG. 6 schematically illustrates the components of the dual channel module and their interconnecting gas flow passages.

DESCRIPTION OF INVENTION

Single Channel Module

Figure 1:
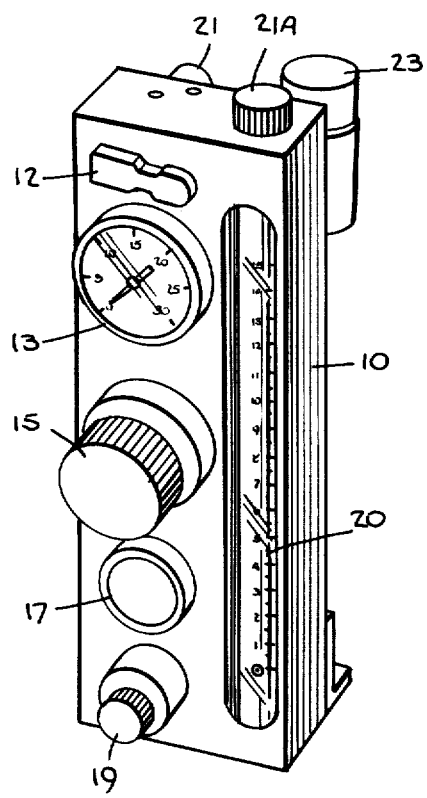
FIG. 1 is a perspective view of a single-channel process gas flow control module in accordance with the invention.
Figure 3:
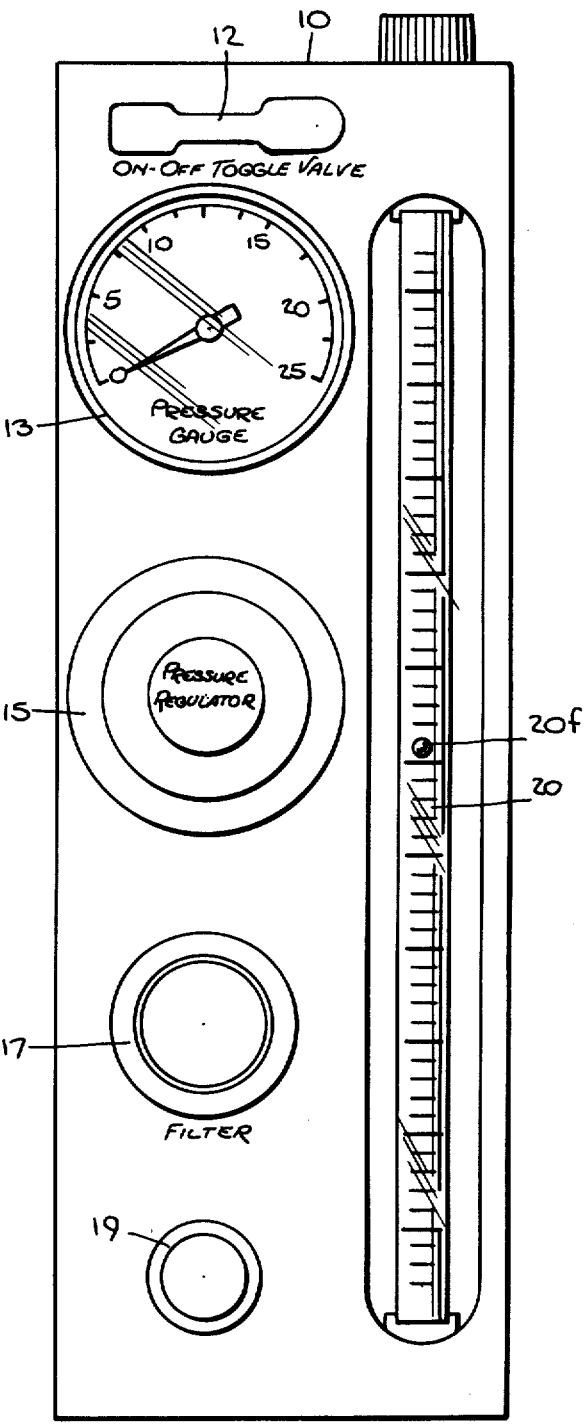
FIG. 3 is a front elevation of the single-channel module.

Referring now to FIGS. 1 to 4, there is shown a single-channel module in accordance with the invention, the module making use of a block 10 of a material which is chemically inert with respect to the process gas to be controlled, the block being provided with cavities which are contoured to nest the various components of the control system. The cavities are threaded to threadably engage those components which are screwed therein, suitable seals of Viton or other material being provided.

Block 10 is preferably molded of polytetrafluoroethylene (TEFLON), a unique high-strength material that is not soluble in any known solvent and which will not melt below about 400° C. The chemical inertness and thermal stability of this material as well as its structural properties render it suitable for chemical operations where drastic conditions exist.

It is to be understood, however, that block 10 need not be in the shape shown but may assume any geometric form appropriate to the use to which it is put. The block is machined, molded, or otherwise fabricated of any solid material of acceptable structural strength that is chemically inert with respect to the process gas being controlled by the module.

The components nested in the block cavities are an on-off toggle valve 11 whose toggle 12 overlies the front face of the block, a gas pressure indicator 13 (0 to 25 psi), a diaphragm-type gas pressure regulator 14 whose pressure-setting knob 15 projects from the front face of the block, a removable gas filter 16 having a rotatable cap 17 projecting from the front face of the block to facilitate removal and replacement of the filter, a flow-control valve 18 having a projecting control knob 19, and a variable-area tube flowmeter 20 whose graduated scale is visible within the cavity for this meter.

As best seen in FIGS. 2 and 4, toggle valve 11 is nested within a cavity that communicates with a tubular inlet fitting 21 adjacent the upper end of block 10, the fitting projecting from the rear of the block. Inlet fitting 21 is coupled by an external line to a source of process gas to be metered by the module, the pressure of the gas from the source being unregulated. Toggle valve 11 functions either to admit gas from inlet fitting 21 to filter 16 or to cut off the gas supply. Toggle valve 11 is linked to filter 16 by an internal bore $b_1$ forming a gas passage therebetween, the gas from the toggle valve flowing downwardly to the filter, as indicated by the direction of the arrows in bore $b_1$.

In one practical embodiment, filter 16 is adapted to afford 0.095 micron filtration to eliminate virtually all contaminants from the gas stream flowing therethrough. The filter cartridge is preferably formed by inert, highly cross-linked aromatic polymers. When the filter cartridge is in need of replacement, it can readily be removed by means of its cap 17.

From filter 16, the purified gas flows upwardly through an internal bore $b_2$, as indicated by the arrows in this bore, to the input end of presure-regulator 14. The output end of regulator 14 is coupled by way of internal bore $b_3$ to metering valve 18, the flow direction in this instance being downward. The setting of regulator 14 is adjusted by turning knob 15; hence the pressure of the gas supplied to control valve 18 is at set value. It is to be noted that, unlike conventional gas flow control systems, the filter is upstream of the pressure regulator, so that the gas delivered thereto is free of contaminants.

From the output of control valve 18, the pressure-regulated gas is fed in the transverse direction via internal bore $b_4$ to the inlet end of flowmeter tube 20 at the base of an elongated flowmeter cavity machined in the block. The outlet end of tube 20 is engaged by a removable outlet fitting 24 whose knob 24A projects above the upper end of block 10. This makes it possible to replace the flow tube without using tools.

The outlet of flowmeter tube 20 is coupled by an internal bore $b_5$ to a tubular outlet fitting 22 projecting from the rear of the block at the upper end thereof. Suspended from outlet fitting 22 is a solenoid valve 23 whose output is coupled by a suitable extension line to the diffusion tube or other process gas utilization device.

Solenoid valve 23 is electrically operated and serves to abruptly admit or cut off the gas feed. Hence by a timed operation of the solenoid valve, one may supply to the gas diffusion tube a predetermined amount of gas whose pressure and flow rate is precisely set by the module. The solenoid valve is optional; for one can manually control the gas feed to provide the desired amount of gas.

The pressure of the gas, as set by pressure-regulator 14, is indicated by pressure meter 13 which is coupled to the regulator by an internal bore $b_6$. Flowmeter 20 affords a flow rate reading of the gas being fed to the diffusion tube while indicator 13 provides a pressure reading thereof.

Flowmeter 20 is of the rotameter type and is provided with a tube with a tapered bore having a variable cross-sectional area. The float $20_f$ disposed in the bore assumes a vertical position, depending on the rate of fluid flow. The vertical position of the float is indicated along the calibrated scale on the front of the tube. In practice, all internal wetted parts are fabricated of stainless steel, except the pressure gauge which is of grass, the gauge being isolated from the gas stream by a gas-permeable barrier.

With a variable-area tube flowmeter, one must be able to remove the meter tube in order to inspect or clean the tube. With the present arrangement, the tube is held in place by outlet fitting 24 and to remove the tube from its cavity one has merely to grip knob 24A to screw out this fitting to disengage the upper end thereof.

Internal bores $b_1$ to $b_6$ constitute a network of gas passages which intercouple the various components of the system. Before the components are placed in the cavities, the cavities and all internal bores in the block are chemically cleaned to assure a contamination-free process gas. However, in the course of prolonged operation, one or more of the bores may become clogged or blocked. To clean these bores, those bores which are not accessible through the cavities are provided with stub bores leading to access ports on the surface of the block, these ports being normally closed by removable set screws or other suitable plugs.

Thus bore $b_1$ is provided with a stub bore $b_{1s}$ which is closed by removable plug $P_1$. Bore $b_2$ is provided with a stub bore $b_{2s}$ terminating in plug $P_2$. Bore $b_3$ is provided with a stub bore $b_{3s}$ closed by plug $P_3$. Bore $b_4$ is provided with stub bore $b_{4s}$ terminating in plug $P_4$. Bore $b_5$ is accessible through the cavity for outlet fitting 22 and hence requires no stub. Bore $b_6$ is provided with a stub bore $b_{6s}$ closed by a plug $P_6$.

Dual-Channel Module

In some instances, the need exists to meter the supply of the same gas—say, oxygen—to two utilization devices at different flow rates. The dual-channel module shown in perspective in FIG. 5 and schematically in FIG. 6 accomplishes this purpose with the minimum number of components.

In this arrangement, the gas to be metered in both channels is admitted through inlet fitting 21 and is conducted by way of an internal bore to filter 16 whose external cap 17 is visible in FIG. 5. From the filter, the purified gas is fed into pressure-regulator 14, the pressure set by the regulator being indicated by pressure gauge 13.

Pressure regulator 14 has two outputs; one going through metering valve 18 and flowmeter 20 to solenoid valve 23 from which it is supplied to a utilization device. The resultant flow control system is the same as that shown in the single-channel module. The other output goes through a metering valve 18' and a flowmeter 20' to solenoid valve 23' from which it is supplied to another utilization device. Thus each channel shares a common filter, pressure regulator, pressure gauge and toggle valve, yet it is possible to separately regulate the flow rate in the respective channels.

While there have been shown and described preferred embodiments of a process gas flow control module in accordance with the invention, it will be appreciated that many changes and modifications may be made therein without, however, departing from the essential spirit thereof. Thus the module may be used to control a liquid such as water rather than a gas.

We claim:

1. A module which integrates in a single block a process gas flow control system adapted to precisely meter the flow of gas fed into a utilization device, said module comprising:

A. a block formed by a body which is chemically-inert with respect to the gas being metered, said body having open cavities therein for nesting the components of the system and a network of internal bores therein that communicate with the cavities to intercouple the components; and B. system components removably nested in said cavities and intercoupled by said network of internal bores, said components including an adjustable pressure-regulator to set the pressure of the gas received from an inlet fitting, an on-off toggle valve to control the passage of gas from said inlet fitting to said regulator, a gas filter interposed between the toggle valve and said regulator, a pressure gauge coupled to the regulator to indicate the set pressure, a metering valve to adjust the flow rate of the regulated gas from the regulator to an output fitting and a flowmeter of the variable area type interposed between the metering valve and the outlet fitting to indicate the flow rate, said flowmeter having a meter tube nested in one of said cavities and held in place by said outlet fitting which is removable to permit removal of said tube, said internal bores having stub extensions terminating in ports on the surface of the block and sealed by removable plugs to permit cleaning of the bores.

2. A module as set forth in claim 1, wherein said block is formed of polytetrafluoroethylene.

3. A module as set forth in claim 1, further including a solenoid valve suspended from said outlet fitting.

4. A module as set forth in claim 1 for dual-channel operation, said regulator having two outputs, one of which is coupled via said metering valve and said flowmeter to said outlet fitting, the other of which is coupled via a second metering valve and a second flowmeter to a second outlet fitting.

5. A module as set forth in claim 4, including a second solenoid valve suspended from the second outlet fitting.

* * * * *